United States Patent [19]
Pitsch

[11] 3,768,568
[45] Oct. 30, 1973

[54] DRAFT RESPONSIVE THREE-POINT HITCH

[75] Inventor: Ronald D. Pitsch, Minnetonka, Minn.

[73] Assignee: White Farm Equipment Company, Hopkins, Minn.

[22] Filed: Dec. 3, 1971

[21] Appl. No.: 204,729

Related U.S. Application Data

[63] Continuation of Ser. No. 879,213, Nov. 24, 1969, abandoned.

[52] U.S. Cl. ................................. 172/7, 172/239
[51] Int. Cl. ........................................ A01b 63/112
[58] Field of Search ............... 172/7–12; 280/446 R, 446 A, 456 A, 460 A, 461 A, 479 R

[56] References Cited
UNITED STATES PATENTS

| | | | |
|---|---|---|---|
| 3,128,830 | 4/1964 | Doering | 172/7 |
| 3,162,247 | 12/1964 | Miller | 172/7 |
| 3,351,137 | 11/1967 | Schulz et al. | 172/7 |

FOREIGN PATENTS OR APPLICATIONS

| | | | |
|---|---|---|---|
| 950,566 | 2/1964 | Great Britain | 172/7 |

*Primary Examiner*—Robert E. Pulfrey
*Attorney*—David A. Burge

[57] ABSTRACT

A three-point hitch for trailingly mounting an agricultural implement on a tractor. The hitch has three links which are connected to the tractor and are movable fore and aft. The links are interconnected at the tractor by means of a reaction linkage. The linkage is arranged to transmit only horizontal forces to a hydraulic control system for improved draft control.

2 Claims, 3 Drawing Figures

PATENTED OCT 30 1973

INVENTOR.
RONALD D. PITSCH

BY *Watts, Hoffmann,
Fisher & Heinke*
ATTORNEYS.

PATENTED OCT 30 1973 3,768,568
SHEET 2 OF 2
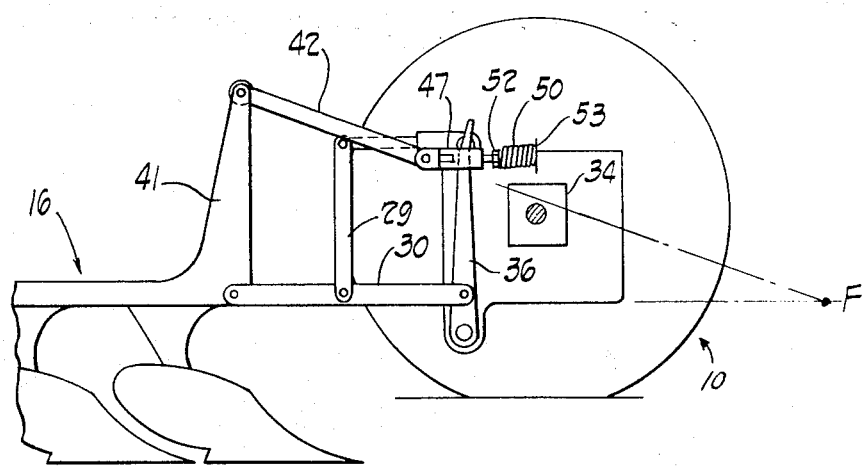
Fig. 2
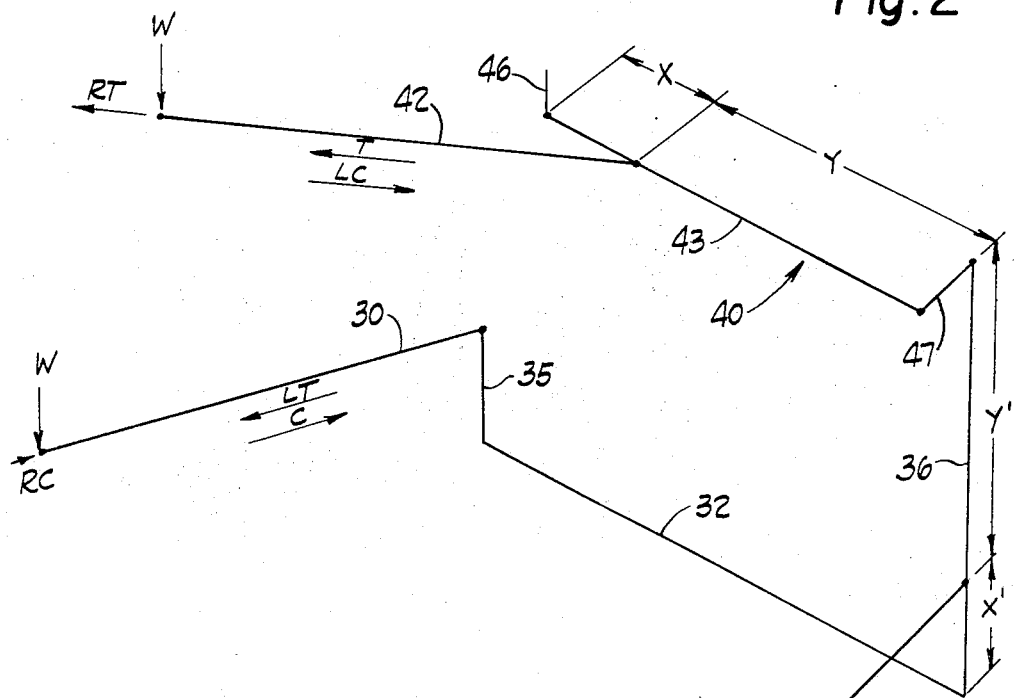
Fig. 3
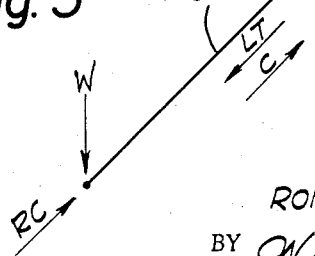
INVENTOR.
RONALD D. PITSCH
BY Watts, Hoffmann,
Fisher & Heinke
ATTORNEYS.

DRAFT RESPONSIVE THREE-POINT HITCH

This is a cointinuation of application, Ser. No. 879,213 filed Nov. 24, 1969, now abandoned.

BACKGROUND OF THE INVENTION

1. Field of the Invention

The invention pertains to the art of earth-working devices adapted to trail behind a propelling means such as a tractor. More particularly the invention pertains to structures known as three-point hitches which are used to couple implements to tractors.

2. The Prior Art

The usual three-point hitch has an upper and two lower struts, usually referred to as links. Forward ends of the links are pivotally connected to a tractor while the rearward ends of the links are detachably and pivotally connected to an implement. When an implement is being pulled in an earth-working operation, the lower links are in tension and the upper link is in compression.

A mechanism is provided for raising and lowering the links to elevate the implement to a transport position and to lower the implement to an earth-working position when desired. Typically, this elevating mechanism will include a hydraulic system.

One objective the designer of agricultural earth-working equipment has is to provide a construction which will impose as uniform a pull or draft load as possible on a tractor as a given earth-working operation is performed. Draft loads are horizontal forces which reflect the resistance of the earth to penetration by a plow or other earth-working implement. If a tractor is being used for plowing, for example, it is desirable to adjust the depth of the plow in the earth so that the draft load imposed on the tractor is as constant as possible.

Variations in soil conditions, unevenness of the terrain and obstructions such as stones are all factors which can vary draft conditions. In known systems, attempts are made to sense these variations in draft conditions. With many of these systems, a sensing mechanism signals the elevating mechanism to raise or lower the implement to compensate for the variations in draft load.

Early commercial three-point hitch arrangements equipped with draft compensation sensed variations in draft conditions through the upper link. Because there are circumstances under which upper-link sensing results in erratic control, mechanisms which sense changed draft conditions on the lower links were subsequently developed. Lower-link sensing, like upper-link sensing, has shortcomings, principal among which is that forces other than draft forces are falsely responded to by the draft-sensing mechanism. These false responses result in improper draft compensation.

There have been proposals for mechanisms which sense forces of both upper and lower linkages. One such proposal was to provide strain gauges in the upper and lower links. While strain gauges might be effective for experimental or test purposes, practical hardware utilizing strain gauges and an electrical or electronic control of hitch elevation has not been developed.

Other proposals were for a linkage interconnecting the upper and the lower links so that when draft conditions were out of balance, the linkages would self-compensate for draft imbalances. With these proposals mechanical adjustments would be provided to adjust the linkage for a given range of draft conditions. While such proposals might be used in relatively uniform draft conditions, the mechanical adjustment required even or such uniform conditions would be extremely difficult and for widely varying draft conditions, where draft compensation is obviously most needed, such proposals are wholly impractical.

Still another proposal sought to sense movement of upper and lower links occasioned by changing draft conditions. This proposal, too, has not been reduced to practical hardware in that it is not capable of accurately summing the forces under all conditions and responding to draft forces alone.

SUMMARY OF THE INVENTION

With the present invention a reaction linkage is provided. The reaction linkage includes a pair of beams which are pivotally connected to the tractor. An upper link of the hitch is pivotally connected to one beam while the lower links are connected to the other.

A draft-sensing hydraulic system is connected to the beams. The connections are such that vertical forces imposed on the linkage are absorbed by the linkage and horizontal forces are normally in equilibrium. When a change of draft forces occurs, the two beams apply horizontal forces to the draft-sensing mechanism. These horizontal forces result in a signal being sent to the elevating mechanism which raises or lowers the switch in response to such signal.

In the preferred arrangement, the beams are mechanically interconnected. The link-to-beam connections are relatively close to the beam-to-tractor connections and far from the beam interconnection. This provided a great mechanical advantage in sensing the changes in draft forces. Actual link or beam movement in response to changing draft conditions is extremely small and, in fact virtually imperceptible.

Accordingly, an object of the invention is to provide a novel and improved three-point hitch mechanism in which vertical forces are absorbed and horizontal forces summed so that the only forces transmitted to a connecting sensing mechanism are horizontal forces due to changes in draft conditions.

These and other advantages will be more apparent by referring to the following description and drawings wherein:

DESCRIPTION OF THE DRAWINGS

FIG. 2 is a side elevational view of the hitch depicted in FIG. 1 showing an implement attached thereo; and FIG. 3 is a schematic diagram showing an analysis of forces in the hitch.

DESCRIPTION OF THE PREFERRED EMBODIMENT OF THE INVENTION

Figure 1:
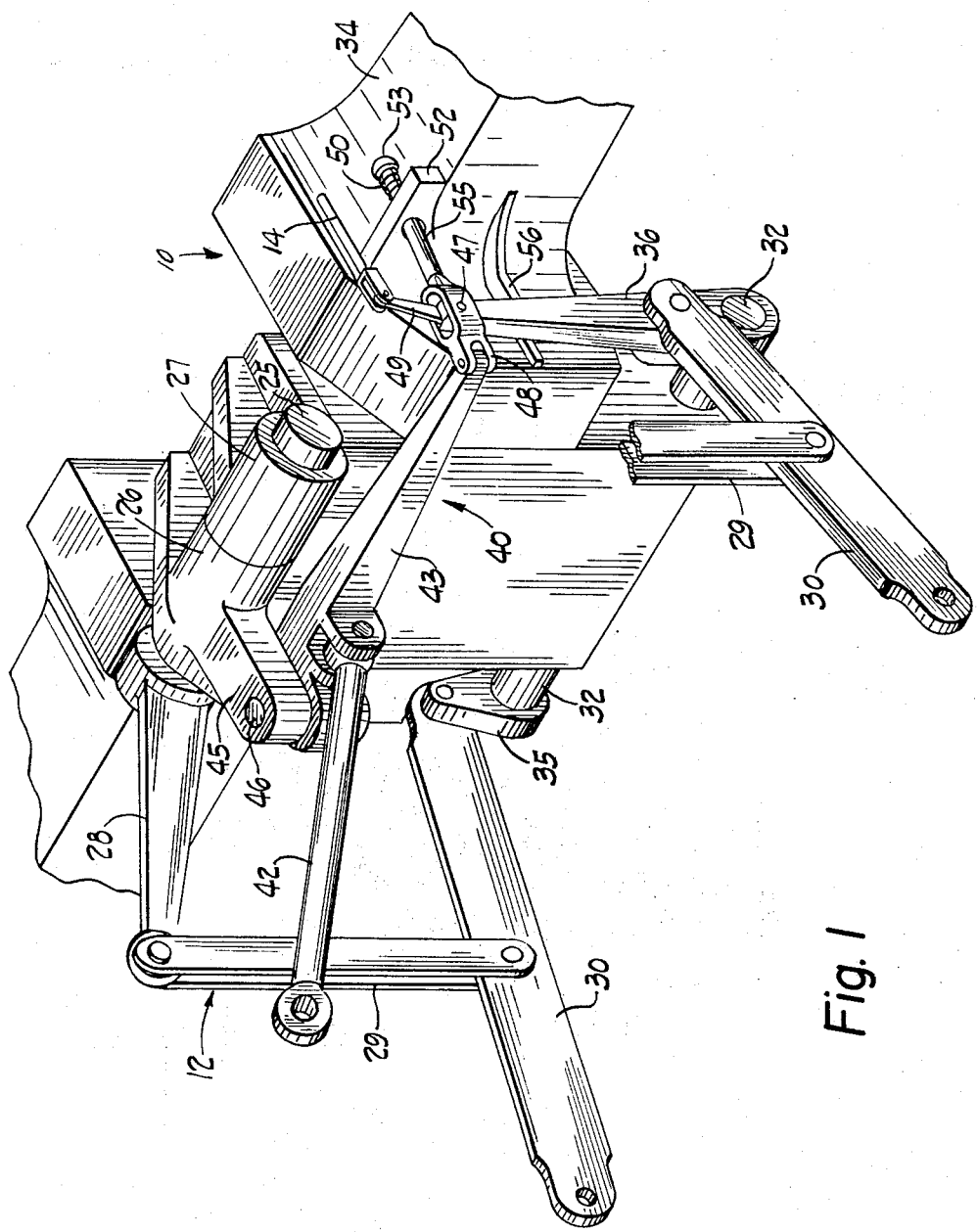
FIG. 1 is a rear fragmentary, perspective view of a tractor showing a three-point hitch mounted thereon incorporating a reaction linkage in accordance with the invention.

Considering the arrangement in FIG. 1, a fragmentary rear portion of a tractor is shown at 10. A hitch 12 is mounted on the tractor 10. The hitch is adapted to be raised and lowered by a power cylinder (not shown). A hydraulic control device, for example of the type disclosed in a co-pending application entitled DRAFT AND POSITION CONTROL FOR TRACTOR DRAWN IMPLEMENTS, filed July 24, 1969, and assigned to the assignee of this application, automatically operates the power cylinder in accordance with draft signals received from the hitch 12. A control rod 14 transmits the signals from the hitch 12 to the hydraulic control device. The rod 14 moves longitudinally in a fore and aft manner in response to the draft forces imposed on the hitch by an implement 16 such as a plow (FIG. 2).

While the hydraulic control device forms no part of the present invention, some understanding of how it functions may be helpful for a better understanding of the invention. Controls of the type referred to may take any one of several forms, but generally will include a valve and a valve-actuating linkage. The actuating linkage is connected to sense the draft loads on the hitch. This linkage is ordinarily connected at the forward end to a reciprocating valve spool of the type having a plurality of lands which cover and uncover passages in the valve in accordance with the movements of the actuating linkage. The valve directs hydraulic fluid from a pump to the power cylinder for raising the hitch or exhausts fluid from the cylinder to a reservoir when lowering the hitch.

A manual control lever accessible to the operator may be set for biasing the valve spool in a direction to increase or decrease the draft responsiveness. If the implement encounters soil conditions producing draft forces in excess of the level imposed on the control by the manual draft setting, then the valve spool becomes unbalanced causing it to shift in a direction to permit fluid supply to the power cylinder which raises the implement relative to the tractor frame until the draft forces are reduced and equilibrium is restored. Conversely, if the draft forces are too light in relation to the draft setting for the control, then the valve spool will be shifted in the opposite direction to uncover exhaust passages in the valve allowing the implement to go lower in the soil under the force of its own weight or suction until the required draft equilibrium is established.

As shown in FIG. 1, a powered rocker shaft 25 extends transversely of the center line of the tractor and projects beyond bosses 26, 27 on the upper portion of the tractor frame. The right end portion of the rocker 25 is shown broken away for clarity as viewed in FIG. 1. A pair of crank arms 28 are mounted on each end portion of the rocker but only the one in the left is shown. Each crank arm 28 projects generally rearwardly of the tractor.

A pair of drop links 29 are provided. The drop links 29 are pivotally connected to end portions of the crank arm 28. A pair of lower struts or links 30 extend trailingly from the rear of the tractor. The drop links 29 extend downwardly to pivotally connect onto the lower struts 30.

A rocker shaft 32 extends transversely beneath tractor axle ssembly 34. The rocker shaft 32 is freely rotatable about a horizontal axis. A crank 35 is mounted on an end portion of the rocker shaft 32, at the left as viewed in FIG. 1. A beam 36 is mounted on the opposite end portion of the rocker shaft 32. The beam 36 forms a part of a reaction linkage assembly 40, discussed in more detail presently. The crank 35 and beam 36 each project generally vertically from, and rotate in unison with, the rocker shaft 32 about its horizontal axis. Forward end portions of the lower links 30 are respectively connected to the crank and beam 35, 36. Since the rocker shaft 32 rotates freely, the links 30 are free to move in a limited fore and aft manner in a direction generally parallel to the ground. The lower links 30 are disconnectably attached to the implement 16. This attachment of the loweer links is provided by a pivotal connection onto the lower portions of a rigid implement mast 41 (FIG. 2).

An upper strut or link 42 is provided. The upper link 42 extends from the tractor above the lower links 30. The upper link 42 has its rearward end pivotally attached to the upper portion of the implement mast 41 (FIG. 2) establishing with the lower struts 30 a three-point mounting arrangement for the implement 16. The upper link 42 is pivotally connected at its forward end to a beam 43. The beam 43 forms part of the reaction linkage assembly 40 discussed presently. The pivotal connection of the upper link and the beam is, transversely speaking, centered on the tractor.

As shown in FIG. 2, extensions of axes of the hitch links 30 and 42 intersect at a virtual center F well forward of the tractor axle assembly 34. The virtual center F is located generally on an imaginary line known as the longitudinal axis of the tractor.

As indicated previously, the hitch 12 includes the reaction linkage assembly 40 (FIG. 1) of which the beams 36 and 43 are a part. The beam 36 is rotatable about the horizontal axis of the rocker shaft 32 and projects virtually above the axle assembly 34. The beam 43 is pivoted on an extension 45 of the boss 26 about a vertical shaft 46. The beam 43 projects laterally from its pivot shaft 46 so that its outer end is in juxtaposed relationship to the upper end of the beam 36. A yoke 47 is pinned onto the upper end of the beam 36 and has a rearwardly-extending clevis portion 48 which receives the outer end of the beam 43. An arm 49 extends upwardly from the beam 36 to provide a suitable attachment for the hydraulic control rod 14.

A return spring 50 is provided, FIGS. 1, 2. One end of the spring 50 bears against a boss 52 on the axle assembly 34. The other end of the spring engages a washer 53.

The spring 50 is a compression spring which restrains the hitch against rearward movement. This restraint is provided by a connection of the spring 50 to the yoke 47 by a connecting rod 55. The connecting rod 55 passes through spring 50 and a hole in the boss 52. One end of the rod 55 carries the washer 53 and the other end is connected to the yoke 47. A stop 56 intercepts the forward movement of beam 36.

It is important to note that the outer end of the beam 43 is permitted to swing in a small arc in a horizontal plane in response to the fore and aft movements of the upper link 42. Likewise, the upper end of beam 36 swings in a small arc in a vertical plane in response to the fore and aft movements of the lower links 30. The radius of each arc is equal. That is, as shown in FIG. 3, the distance between the horizontal axis of rotation of beam 36 to its pivotal connection with the yoke 47 ($x'y'$) is the same as the distance from the vertical axis of rotation of beam 43 to its pivotal connection with the yoke 47 ($xy$).

The cooperation of beam 36, 43 on separate horizontal and vertical rotational axes is an important feature of the invention. This arrangement permits the use of the greatest transverse and vertical lever arm lengths $x$, $y$, $x'$, $y'$ consistent with the hitch geometry. As a result of the very slight movement at the upper end of beam 36 and at the outer end of beam 43 it is beneficial to the control function if the force transmitted is as much as possible. The extended lengths $yy'$ of the beams 36, 43 from the point of application of the draft force to their ends provides a known amplification factor. Thus even slight variations in the draft load in either the upper or lower links 30, 42 will be amplified along the fore and aft line of movement of the control rod 14. The hitch control device therefore receives a draft response signal reflecting a summation of forces on the upper and lower links which, owing to the amplification factor, provides for more positive and accurate control of the working depth of the implement.

With an implement in which the weight is centered to the rear of the mast 41, as with the plot 16 depicted in FIG. 2, there is a considerable overhanging load placed on the hitch 12. In a raised or transport position, the weight W (FIG. 3) of the implement is supported entirely by the hitch so as to place the upper link 42 in tension T and the lower links 30 in compression C. When the implement 16 is lowered into engagement with the ground and is being pulled by the tractor, the draft loads LT act generally parallel to the lower links 30 placing them in tension while the upper link 42 is normally in compression LC. This condition, however, can be reversed, especially under light draft conditions, where there is a large overhanging implement mass. In this event, the summation of the weight reaction of the implement and the draft loads can produce a resultant force RT acting in tension on the upper link 42 and in compression RC on the lower links 30. With prior commercially available draft sensing devices, this set of conditions would result in a false signal being transmitted to the automatic hitch control device. With such prior devices a power cylinder would, under such conditions, operate in a fashion wholly inconsistent with actual draft conditions as described earlier.

With this invention, the possibility of a false draft signal is largely eliminated. False draft signals are eliminated because the reaction linkage 40 equalizes the horizontal force components transmitted by the beams 36, 43 from the links 30, 42. Thus the forces RT, RC imposed on the hitch by the overhanging mass of the implement are resolved into balanced horizontal components. This is because the links 30, 42 are mechanically interdependent in their fore and aft movements relative to the tractor frame owing to the reaction linkage 40. Likewise the longitudinal draft forces equal to the forces LT in the lower links 30 are transmitted to the upper link 42 in the same direction and magnitude. The transmitted force tends to equalize the forces equal to LC of compression in the link. Thus any fore or aft movements of the lower links 30 e.g., due to a change in draft loading, are followed equally by the upper link 42. It may be desirable, however, to vary the ratio of the reaction linkage by changing the relationship of moment arms $x'$, $x$. For example, this may be accomplished by connecting the links 30 at greater distances from their horizontal axis of rotation than the upper link 42 is from its vertical axis of rotation. This imposes an over balanced condition on the linkage which avoids the problem often encountered in balanced servo control systems where the control is constantly hunting equilibrium. Generally, the ratio of the distance $x$ or $x'$ to the distance $y$ or $y'$ will always be less than one.

From the foregoing, it will be appreciated that the invention provides a draft responsive hitch of much greater sensitivity than that afforded in the prior art. Although only a certain specific embodiment has been described, it is apparent that those skilled in the art can well understand the principle of operation of the invention and possibly envision modifications to the specific embodiment without departing from the invention as defined in the appended claims.

I claim:

1. In combination with a tractor, an improved three-point hitch comprising:
   a. upper and lower link support beams each pivotally mounted on the tractor and oriented generally perpendicular to one another;
   b. an upper draft link pivotally connected to said upper beam and a pair of lower draft links pivotally connected to said lower beam;
   c. connection means interconnecting said beams such that a tension loading applied through the connections of said lower draft links will urge said interconnected beams in a direction opposite to that urged by a compression loading applied through the connection of said upper draft link;
   d. said interconnection between said beams being spaced from said pivotal mountings of each of said beams;
   e. said upper draft link pivotal connection being located intermediate the pivotal mounting of said upper beam and said interconnection between said beams;
   f. said lower draft link pivotal connections being located along an axis intersecting said lower beam at a location intermediate the pivotal mounting of said lower beam and said interconnection between said beams;
   g. draft-sensing means connected to said beams to sense concurrent movement of said beams due to variations of draft force applied when in use by a connected draft load producing implement through said draft links;
   h. said draft-sensing means being connected to said beams at a location further from each of said beam mountings than are said pivotal link connections from said beam mountings, whereby a second class lever arrangement is provided which increases the sensitivity of said draft-sensing means by causing said draft-sensing means to move through a greater distance in response to a change of draft forces due to said draft links, and the movement of said draft-sensing means is due substantially only to variations in draft forces;
   i. draft control means connected with at least one of said draft links and operatively connected to said draft-sensing means to adjust the position of said draft links according to draft variations sensed by said sensing means;
   j. said pivotal connection of said upper beam to the tractor mounts said upper beam for pivotal movement about a generally vertical axis;
   k. said pivotal connection of said lower beam to the tractor mounts said lower beam for pivotal movement about a generally horizontal axis; and,
   l. said interconnection between said beams being located above said pivotal connection of said lower beam and laterally of said pivotal connection of said upper beam.

2. The combination of claim 1 wherein:
a. the spacings between said pivotal mountings and said interconnections for each of said beams are substantially equal; and,
b. the distances between said pivotal mountings and said pivotal connections for each of said beams are substantially equal;

c. whereby a compression force carried by said upper link will be counteracted by a tension force carried by said lower links such that if said forces are of substantially equal magnitude, they will cause substantially no resultant movement of said interconnected beams.

* * * * *

UNITED STATES PATENT OFFICE
CERTIFICATE OF CORRECTION

Patent No. 3,768,568  Dated October 30, 1973

Inventor(s) RONALD D. PITSCH

It is certified that error appears in the above-identified patent and that said Letters Patent are hereby corrected as shown below:

Column 2, line 28, delete "switch" - - and substitute - - hitch - - .

Column 5, line 2, following "is" insert - - amplified - - .

Column 1, line 2, "cointinuation" should read -- continuation --.

Signed and sealed this 7th day of May 1974.

(SEAL)
Attest:

EDWARD M. FLETCHER, JR.
Attesting Officer

C. MARSHALL DANN
Commissioner of Patents